May 5, 1959  C. D. EICHELBERGER ET AL  2,885,502
ELECTRIC SWITCHGEAR OF THE DRAWOUT TYPE
Filed Dec. 27, 1957
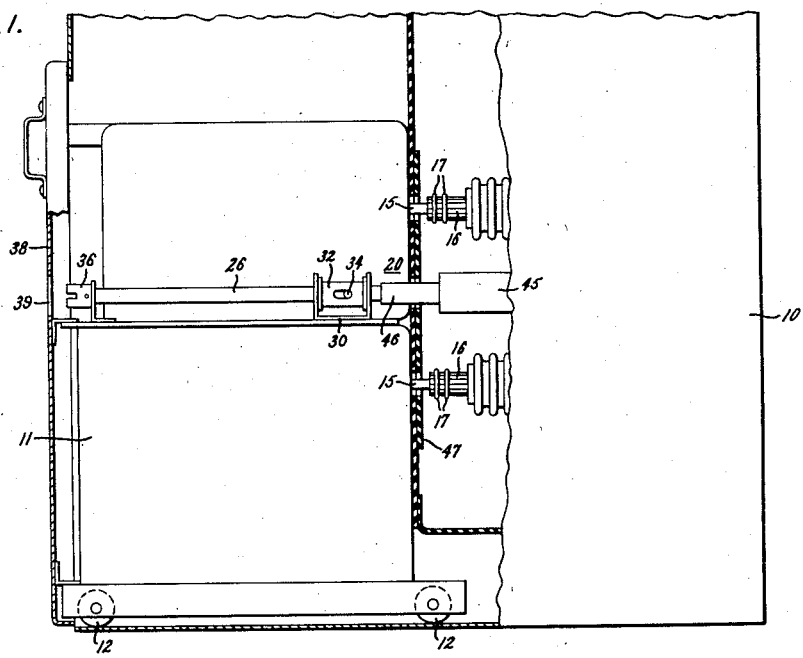
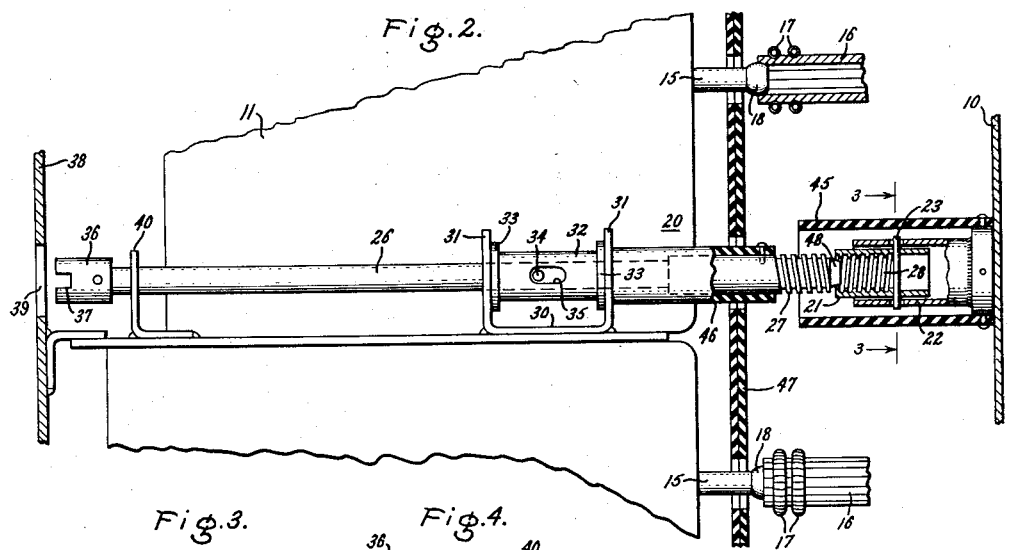
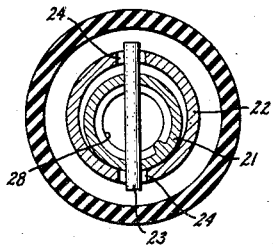
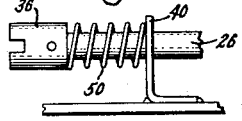
Inventors:
Charles D. Eichelberger,
William N. Lester,
by
Their Attorney.

2,885,502
ELECTRIC SWITCHGEAR OF THE DRAWOUT TYPE

Charles D. Eichelberger, Ridley Park, and William N. Lester, Norwood, Pa., assignors to General Electric Company, a corporation of New York Application December 27, 1957, Serial No. 705,657

8 Claims. (Cl. 200—50)

This invention relates to electric switchgear of the draw-out type and, more particularly, relates to a racking mechanism for forcing a movable switchgear unit into and out of a connected position within an enclosure.

The invention is specifically concerned with a racking mechanism of the type which relies upon disengageable threaded parts for forcing the switchgear unit into and out of its connected position. A difficulty which has been present in prior mechanisms of this general type is that the threads of the disengageable parts could be rather easily damaged by impacts resulting from movement of the switchgear unit toward its connected position while the threaded parts were still disengaged.

Accordingly, an object of the present invention is to construct the racking mechanism in such a manner that its threaded parts are not susceptible to being easily damaged, even during the period in which they are disengaged and the movable switchgear is being pushed toward its connected position.

Another object is to avoid possible damage to the threads of the racking mechanism as a result of overloads produced by racking forces applied before the threads are sufficiently engaged.

Another object is to construct the racking mechanism in such a manner that its threaded parts can function properly in spite of minor dimensional variations which might occur from one switchgear unit to the next, thus permitting interchangeability with relation to a number of different switchgear units and enclosures.

In carrying out our invention in one form, we mount a threaded part on the enclosure for a movable switchgear unit. On the movable unit we rotatably mount a rod having a threaded portion which is arranged to coact with the threads of the first part to produce longitudinal movement of the rod upon rotation of the rod. Coupling means is provided for transmitting longitudinal movement of the rod to the movable unit so as to drive the movable unit from a position of initial-contact-engagement to a position of full-contact-engagement in response to rotation of the rod. The coupling means allows a limited amount of free longitudinal movement of the rod relative to the movable unit when the unit is in its position of initial-contact-engagement. This freedom of longitudinal movement allows the threaded portion of the rod to be freely moved into and out of engagement with the first threaded part when the unit is in its position of initial-contact-engagement and, thus, assures that the momentum of the switchgear unit, as it is being pushed into its position of initial-contact-engagement, will not be imparted to the threads.

For a better understanding of the invention, reference may be had to the following description taken in connection with the accompanying drawing, wherein:

Fig. 1 is a side elevational view, partly in section, showing switchgear apparatus embodying one form of the invention. This figure depicts the parts of the apparatus in a position of full-contact-engagement.

Fig. 2 is an enlarged view of a portion of the apparatus shown in Fig. 1. This figure depicts the parts of the apparatus in a position of initial-contact-engagement.

Fig. 3 is an enlarged sectional view taken along the line 3—3 of Fig. 2.

Fig. 4 illustrates a modification of the apparatus of Figs. 1 through 3.

Referring now to Fig. 1, the switchgear apparatus shown therein comprises a stationary enclosure 10 and a removable, or draw-out, switchgear unit 11 which is mounted on suitable wheels 12. The wheels 12 allow the removable unit 11 to be rolled horizontally into and out of the fully-connected position shown in Fig. 1. In the fully-connected position of Fig. 1, a set of plug-type contacts 15 carried by the movable switchgear unit 11 is fully inserted into a set of socket-type stationary contacts 16 suitably supported on the enclosure 10. Mating pairs of contacts 15 and 16 form the terminals for a power circuit (not shown) extending through the switchgear unit and suitably controlled thereby.

The contacts 15 and 16 are shown in detail in Fig. 2, where they are depicted in a position of initial engagement. Each stationary contact 16 is shown formed as a longitudinally split, or segmented, tube encircled by a pair of garter springs 17. Each of the movable plug contacts 15 is shown formed with an enlarged head 18 which is adapted to be forceably slid to the right into one of the tubes 16. To provide the desired contact pressures when the contacts are in their fully-engaged position, the garter springs 17 must be relatively strong, and, as a result, considerable force is required in order to force the stationary contacts 15 from their position of initial engagement to the right into their position of full engagement.

To aid in driving the switchgear unit 11 together with its movable contacts 15 into the fully-connected position of Fig. 1, a racking mechanism 20 is provided. This racking mechanism 20 comprises an internally-threaded nut 21 which is mounted on the stationary enclosure 10 by means of a tube 22 and an anchoring pin 23. The tube 22 is rigidly attached to a vertical wall of the enclosure 10 and encircles the nut 21. The anchoring pin 23 is shown rigidly attached to the nut 21 and extends diametrically thereacross into a pair of openings 24 formed in the tube 22. The openings 24 are appreciably larger than the pin 23, and as a result, permit a limited amount of free movement of the nut 21 in all directions. This floating or universal mounting serves an important purpose which will soon be pointed out in detail.

The racking mechanism 20 further includes a rod or jackscrew 26 which is carried by the movable switchgear unit 11 and is rotatably mounted thereon. The rod or jackscrew 26 extends in a direction parallel to the path of movement of the switchgear unit 11, and, at its right hand end, has external threads 27 which are adapted to mesh with the internal threads 28 of the nut 21. When these threads 27, 28 are in mesh, rotation of the jackscrew 26 causes the threads to shift the jackscrew longitudinally, and this longitudinal movement is utilized to rack the switchgear unit 10 into and out of its fully-connected position.

For utilizing longitudinal movement of the jackscrew 26 to produce this racking action, coupling means comprising a U-shaped bracket 30 suitably fixed to the movable unit 11 is provided. Each arm 31 of the bracket 30 has an opening which loosely receives an unthreaded portion of the jackscrew 26. Between the arms 31 and encircling the jackscrew 26 is a sleeve 32, which is freely rotatable with respect to the arms 31. Suitable thrust washers 33 are loosely interposed between the sleeve 32 and the arms 31 to facilitate free rotation of the sleeve 32. These thrust washers substantially prevent axial shifting of the sleeve 32 relative to the arms 31. The sleeve 32 has a slot 35 formed therein and extending longitudinally of the jackscrew. A projecting pin 34 fixed to the jackscrew 26 is loosely received within the slot 35 so as to allow for a limited amount of free longitudinal movement of the jackscrew 26 relative to the sleeve 32 during certain intervals (soon to be pointed out).

To facilitate rotation of the jackscrew, or rod, 26, a slotted head 36 is secured to the jackscrew at its left-hand end. The slot 37 in the outer end of the head is adapted to receive a pin carried by a crank or similar tool (not shown) which can be suitably operated to transmit rotary forces through such pin to the jackscrew 26. A protective panel 38 attached to the outer end of the movable unit 11 has an opening 39 formed therein to allow for access to the head 36 of the jackscrew. A suitable bracket 40 is fixed to the movable switchgear unit 11 to aid in supporting the jackscrew 26 on the movable unit. To this end, the bracket 40 has an opening therein which loosely receives the jackscrew and provides a rotary bearing therefor at its left hand end.

Assume now that the switchgear unit 11 is out of its enclosure 10 and that it is desired to connect it in circuit with the stationary contacts 16. This is accomplished by inserting the unit 11 into the enclosure and then manually rolling it to the right until its contacts 15 engage the contacts 16. The contacts 16, being resilient, act as yieldable buffers which halt the rightward movement of the unit 11 in the position of Fig. 2.

The threads 27 at the right hand end of the jackscrew 26 are protected from damage during this insertion operation by the fact that the jackscrew 26 is then free to slide longitudinally of the unit 11. Thus, if the jackscrew happens to contact the nut 21 first and is thus restrained from further movement, it simply slides relative to the moving switchgear unit 11, and thereby receives substantially none of the momentum of the massive unit 11. This momentum rather than being imparted to the threads, in the form of possibly-damaging impact, is absorbed by the stationary resilient contacts 16 at a subsequent instant, i.e., when the movable contacts 15 engage the stationary contacts.

If the jackscrew 26 happens to be positioned with the pin 34 near the back wall of the slot 35 during insertion of the switchgear unit, contact between the threads of the jackscrew and the nut will be altogether avoided prior to engagement of contacts 15 and 16. In Fig. 2, it is assumed that the jackscrew is so positioned when the contacts 15 and 16 engage.

To rack the switchgear unit 11 into its fully-connected position from the position of Fig. 2, the attendant slides the jackscrew forward from its position of Fig. 2 until the threads 27 of the jackscrew engage the threads 28 of the nut 21. The jackscrew is then rotated, in a direction to cause the threads to mesh and force the jackscrew longitudinally to the right. After several turns of the jackscrew, the pin 34 has moved into engagement with the forward wall of the slot 35. Thereafter, as the jackscrew moves longitudinally to the right in response to rotation thereof, the pin 34 acts through the sleeve 32 and the brackets 31 to drive the movable switchgear unit 11 to the right. This is continued until the switchgear unit 11 together with its contacts 15 have reached their fully-connected position. This position is depicted in Fig. 1, where the pin 34 can be seen disposed against the right hand wall of the slot 35.

It is highly desirable that the jackscrew 26 be advanced into the nut 21 by several turns before the pin 34 has moved into engagement with the forward wall of the slot 35. This assures that at the time racking loads are first applied to the threads 27 and 28, the threads will be engaged sufficiently to preclude possible breakage of the threads as a result of racking loads. For the first turn or so of the jackscrew 26, the pin 34 will be out of engagement with the end wall of slot 35 and, thus, no significant racking forces will be applied to the threads 27, 28 during this interval. It is only after the jackscrew has been advanced into the nut 21 by several turns that racking loads commence.

Another advantage of our slotted connection 34, 35 is that the attendant is relieved of the necessity for manually forcing the movable unit 11 further into contact position in order to engage the threads 27, 28 of the racking mechanism. The slotted connection allows this engagement to be achieved simply by sliding the jackscrew 26 forward independently on the unit 11, as is described hereinabove.

It will be apparent that the racking mechanism 20 serves the additional function of locking the movable switchgear unit 11 in its fully connected position of Fig. 1, thereby holding the contacts 15, 16 engaged against possible short-circuit forces tending to separate them.

For racking the switchgear unit out of its fully-connected position of Fig. 1 and into its position of Fig. 2, the jackscrew 26 is rotated in an opposite direction to that previously described. Initially, such rotation of the jackscrew causes the threads to shift the jackscrew to the left, but this motion is not transmitted to the switchgear unit until the pin 34 engages the left hand end of the slot 35. After this has occurred, continued rotation of the jackscrew 26 forces the switchgear unit to the left and into its position of Fig. 1. Thereafter, the switchgear unit 11 may be rolled manually from the enclosure 10 without restraint from the garter springs 17 or from the racking mechanism 20.

For minimizing the possibility of an electrical breakdown between the contacts 15, 16 and the racking mechanism 20, insulating tubes 45 and 46 are provided. The tube 45 surrounds the nut 21 and is fastened to the enclosure 10, whereas the tube 46 surrounds the jackscrew 26 and is fastened thereto. When the switchgear unit 11 is in its fully-connected position, these tubes are in telescoping relationship, as shown in Fig. 1. In such relationship, the tubes provide for materially lengthened creepage paths between the contacts 15, 16 and the racking mechanism 20 thus decreasing the possibility of an electrical breakdown between these parts.

To prevent an attendant from accidentally contacting the elements 16 when the unit 11 is removed, a suitable shutter 47 is provided. This shutter operates in a known manner to cover the contacts 16 when the unit is removed.

The floating, or universal, mounting of the nut 21 on the enclosure 10 allows the switchgear unit 11 to be used interchangeably with other similar units, even though there are minor dimensional variations from one unit to the other. In this regard, if the jackscrew 26 is not located in precisely the same position in a substituted unit, the nut 21 is free to shift relative to the enclosure 10 to compensate for such differences. Irrespective of such compensating action on the part of nut 21, the racking mechanism 20 is still capable of performing in the intended manner described hereinabove.

Because of its freedom of motion, the nut 21 normally rests at the bottom of the tube 22 when the jackscrew is disengaged therefrom. However, when the jackscrew 26 is shifted to the right during an insertion operation, a tapered end 48 formed thereon lifts the nut into alignment with the jackscrew and thereby positions the threads for proper meshing engagement.

If the jackscrew happens to be positioned with its pin 34 at the front of the slot 35 during the insertion operation, its threads 27 will engage the nut 21 prior to engagement of the contacts 15, 16, as has been pointed out hereinabove. We have found, however, that the sliding action allowed by the slot 35 renders this engagement ineffective to harm the threads, at least for threads formed of conventional types of materials. If, for some reason, it is desired to use a type of material which might be harmfully affected by such engagement, then such engagement can be precluded altogether by utilizing the modified arrangement of Fig. 4. Referring to Fig. 4, a light compression spring 50 is shown interposed between the head 36 and the bracket 40. This compression spring maintains the jackscrew in its withdrawn position during insertion of the movable unit 11, and thereby precludes the threads 27 and 28 from engaging prior to engagement of the contacts 15, 16.

Although we prefer to mount the internally-threaded part (21) on the enclosure as is shown in the drawing, it will be apparent that such part could be replaced by an externally threaded part. In such case, the jackscrew would be provided with internal threads to mesh with the external threads of the part mounted on the enclosure.

While we have shown and described a particular embodiment of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. In switchgear apparatus of the type comprising racking mechanism for driving a movable switchgear unit within an enclosure between a position of initial-contact-engagement and a position of full-contact-engagement, said racking mechanism comprising a first threaded part mounted on said enclosure, a rod rotatably mounted on said switchgear unit and having a second threaded part arranged to coact with the threads of said first threaded part for moving said rod longitudinally in response to rotation thereof, coupling means for transmitting longitudinal movement of said rod to said switchgear unit for driving said switchgear unit from a position of initial-contact-engagement to a position of full-contact-engagement in response to rotation of said rod, said coupling means allowing a limited amount of free longitudinal movement of said rod relative to said switchgear unit when said switchgear unit is in its position of initial-contact-engagement, said freedom of longitudinal movement allowing the threaded part of said rod to be freely moved into and out of engagement with said first threaded part when said switchgear unit is in its position of initial-contact-engagement.

2. The apparatus of claim 1 in which said freedom of motion also allows said rod to be rotated to effect a substantial meshing of the threads of said parts while said movable unit remains in its position of initial-contact-engagement.

3. The apparatus of claim 1 in which one of said threaded parts is mounted on its supporting structure by means allowing floating motion of said one threaded part relative to said supporting structure.

4. The apparatus of claim 1 in which one of said threaded parts is mounted on its supporting structure by means allowing floating motion of said one threaded part relative to said supporting structure, and the other of said threaded parts has a tapered projecting portion for aligning said threaded parts in response to relative movement of said parts into a position of engagement.

5. In switchgear apparatus of the type comprising racking mechanism for driving a movable switchgear unit within an enclosure between a position of initial-contact-engagement and a position of full-contact-engagement, said racking mechanism comprising a first threaded part mounted on said enclosure, a rod rotatably mounted on said switchgear unit and having a second threaded part arranged to coact with the threads of said first threaded part for moving said rod longitudinally in response to rotation thereof, a sleeve mounted on said rod and freely rotatable with respect to said movable switchgear unit, means for substantially precluding longitudinal movement of said sleeve relative to said switchgear unit, and connecting means between said sleeve and said rod for causing the sleeve to rotate with the rod, said connecting means allowing a limited amount of free longitudinal movement of the rod relative to the sleeve, said freedom of longitudinal movement allowing the threaded part of said rod to be freely moved into and out of engagement with said first threaded part when said switchgear unit is in its position of initial-contact-engagement.

6. Switchgear apparatus comprising an enclosure, a first set of contacts located within the enclosure and mounted thereon, a switchgear unit movable into and out of said enclosure, a second set of contacts mounted on said movable switchgear unit and located to initially engage said first set of contacts when said switchgear unit is moved a predetermined distance into said enclosure, additional movement of said switchgear unit into said enclosure driving said second set of contacts through a predetermined amount of wiping travel and into a fully-engaged position relative to said first set of contacts, a first threaded part mounted on said enclosure, a rod rotatably mounted on said switchgear unit and having a second threaded part arranged to coact with the threads of said first threaded part for moving said rod longitudinally in response to rotation thereof, coupling means for transmitting longitudinal movement of said rod to said switchgear unit for driving said switchgear unit from a position of initial-contact-engagement to a position of full-contact-engagement in response to rotation of said rod, said coupling means allowing a limited amount of free longitudinal movement of said rod relative to said switchgear unit when said switchgear unit is in its position of initial-contact-engagement, said freedom of longitudinal movement allowing the threaded part of said rod to be freely moved into and out of engagement with said first threaded part when said switchgear unit is in its position of initial-contact-engagement.

7. The apparatus of claim 6 in which said first set of contacts act as yieldable buffers for temporarily halting insertion of said movable unit after said unit has been moved said predetermined distance into said enclosure.

8. The apparatus of claim 6 in combination with spring means for biasing said rod into a position in which its threaded portion is effectively disengaged from said threaded part when said movable switchgear unit is in its position of initial-contact-engagement.

References Cited in the file of this patent

UNITED STATES PATENTS

| | | |
|---|---|---|
| 1,416,182 | Farmer | May 16, 1922 |
| 1,791,446 | French | Feb. 3, 1931 |
| 1,798,705 | Rugg et al. | Mar. 31, 1931 |
| 2,273,002 | Mahoney | Feb. 10, 1942 |
| 2,504,018 | Gibson et al. | Apr. 11, 1950 |
| 2,792,462 | Kozlovic | May 14, 1957 |